Feb. 20, 1951 — F. L. CARLSON — 2,542,476
GRAIN CONE
Filed April 7, 1947 — 2 Sheets-Sheet 1
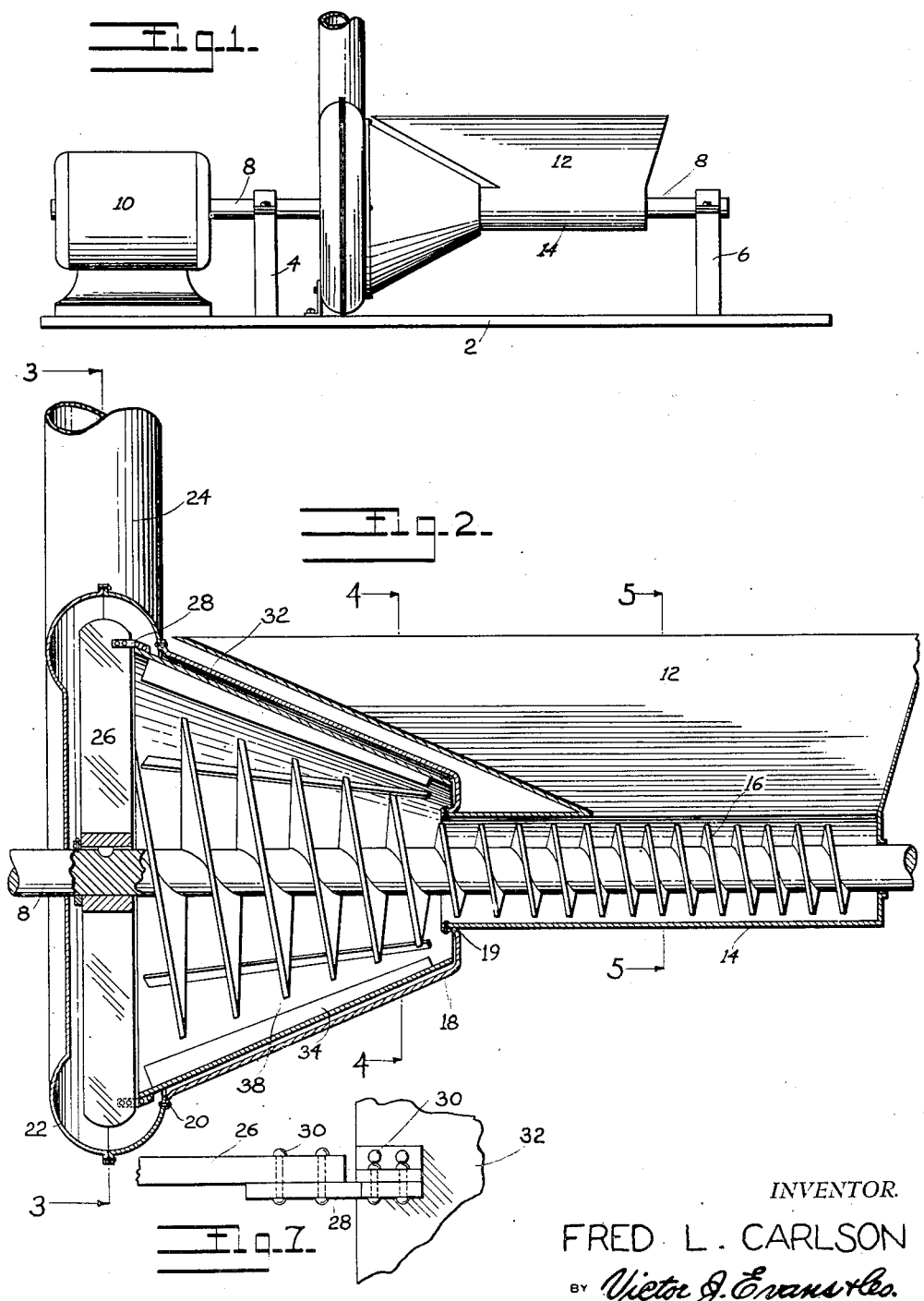
INVENTOR.
FRED L. CARLSON
BY Victor J. Evans & Co.
ATTORNEYS

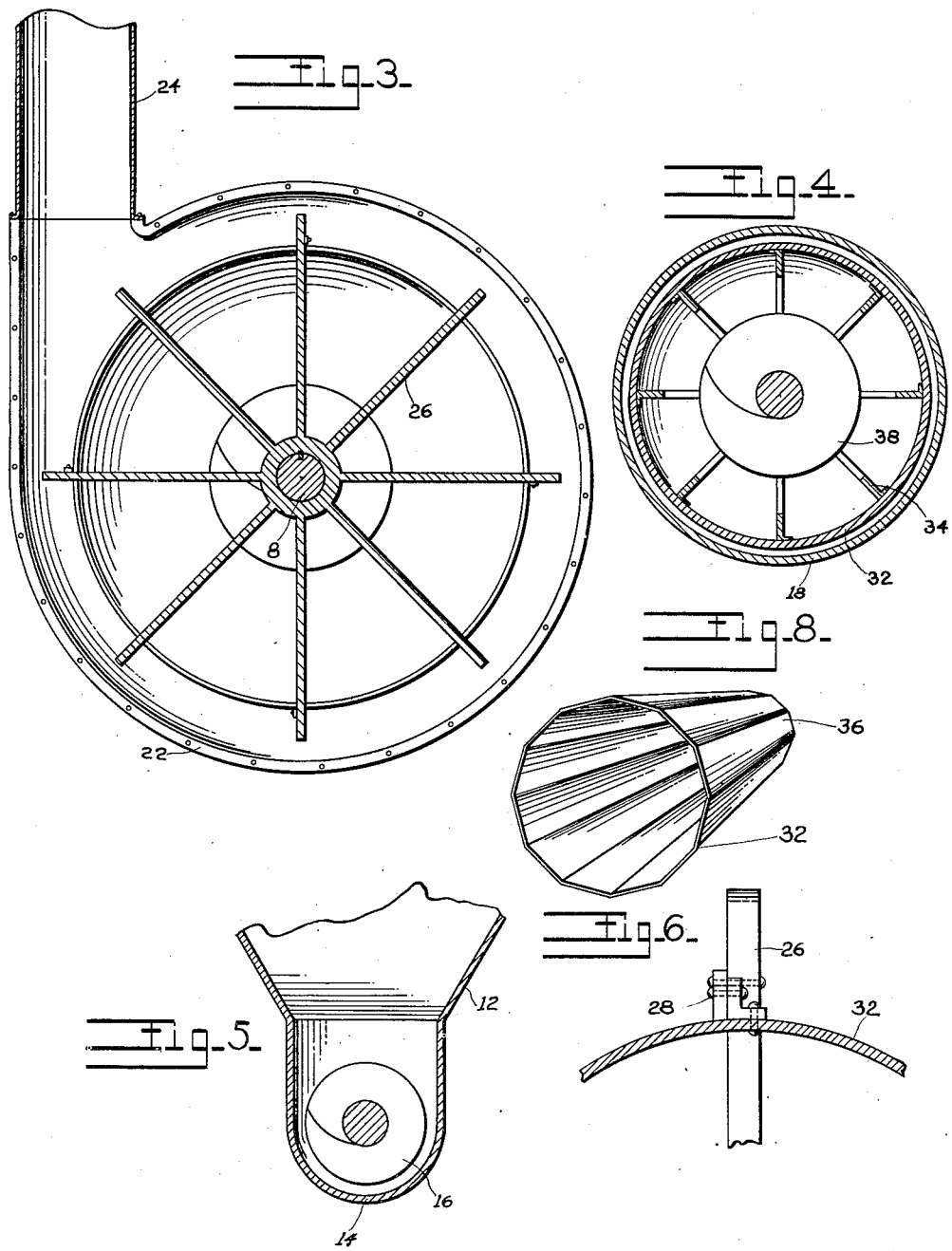

Patented Feb. 20, 1951

2,542,476

UNITED STATES PATENT OFFICE 2,542,476

GRAIN CONE

Fred L. Carlson, Potter, Nebr.

Application April 7, 1947, Serial No. 739,853

2 Claims. (Cl. 302—37)

My present invention relates to an improved grain cone of the type associated with a screw conveyor for feeding grain to a discharge blower, the cone being so arranged as to force helical motion to the grain as it is fed to the blower so that the impact of the discharge blast of air will be upon moving grain rather than stationary grain.

The purpose of my invention is to give speed of motion to the grain to be discharged to prevent the grain from cracking.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a side elevational view of the structure of my invention.

Fig. 2 is a longitudinal vertical sectional view thereof.

Figs. 3, 4 and 5 are vertical transverse sectional views at the indicated lines of Fig. 2.

Fig. 6 is an end view of the structure attaching the cone to the fan blades.

Fig. 7 is a top plan view thereof.

Fig. 8 is a perspective view of the cone.

In carrying out my invention I employ a base 2 and the brackets 4 and 6 on the base support and journal the shaft 8 from the power plant 10.

A feed trough or hopper 12 has a lower cylindrical casing 14 for the screw conveyor 16 on the shaft. A frustro-conical shaped housing 18 is riveted at 19 to the casing 14 at the smaller end and the larger end is secured at 20 to the housing 22 having a discharge spout 24 for grain from a rotor with the fan blades 27 on the shaft.

Secured to the blades 26 by bracket 28 riveted at 30 of the fan or blower I use a frustro-conical shaped member 32 which may be formed with interior ribs 34 or with flat sides as at 36. A conical screw conveyor 38 on shaft 8 operates within the cone to feed grain toward the fan for discharge and the ribs or angular joints between the flat sides lift the grain up the side of the cone to give movement and increasing speed to the grain before it enters the fan or blower.

Thus the grain will be moving at increasing speed in the direction of discharge in the cone and when it reaches the fan housing the increase in the rate of movement to discharge will be relatively small and no damage will result to the grain.

Having thus fully described my invention what I claim as new and desire to secure by Letters Patent is:

1. In a grain blower feeder, the combination which comprises a blower having a rotor with radially disposed blades, a shaft on which the rotor is mounted, a frustro-conical shaped member having longitudinally disposed ribs on the inner surface carried by the rotor and extended laterally therefrom with the center thereof aligned with the axis of the shaft and with the smaller end open and extended outwardly, a stationary blower housing including a frustro-conical shaped section enclosing the rotor and positioned with the frustro-conical shaped member of the rotor nested in the frustro-conical shaped section thereof, a cylindrical housing extended from the small end of the said frustro-conical shaped section of the housing, said cylindrical housing having an opening in the upper part thereof, a hopper extended upwardly from the opening in the upper part of the said cylindrical housing, said shaft on which the rotor is mounted extended through the said frustro-conical shaped member of the housing and cylindrical section of the housing, a continuous screw thread extended from the rotor through the frustro-conical shaped section of the housing and also through the cylindrical section thereof, the outside diameter of said screw thread gradually enlarging in the frustro-conical shaped section of the housing from the small to the large end thereof said blower housing having a discharge connection, and means feeding grain to the small outer end of the said frustro-conical shaped section of the housing.

2. In a grain blower feeder, the combination which comprises a blower having a rotor with radially disposed blades, a shaft on which the rotor is mounted, a frustro-conical shaped member having longitudinally disposed ribs on the inner surface carried by the rotor and extended laterally therefrom with the center thereof aligned with the axis of the shaft and with the smaller end open and extended outwardly, a stationary blower housing including a frustro-conical shaped section enclosing the rotor and positioned with the frustro-conical shaped member of the rotor nested in the frustro-conical shaped section thereof, said blower housing having a discharge connection, said shaft having gradually enlarging threads thereon providing a feed screw positioned in the said frustro-conical shaped member and means feeding grain to the small outer end of the said frustro-conical shaped section of the housing.

FRED L. CARLSON.

REFERENCES CITED

The following references are of record in the file of this patent:

UNITED STATES PATENTS

| Number | Name | Date |
|---|---|---|
| Re. 11,512 | Landis | Nov. 12, 1895 |
| 618,361 | Landis | Jan. 24, 1899 |
| 963,080 | Seburn | July 5, 1910 |
| 1,348,829 | Gabel et al. | Aug. 3, 1920 |
| 2,225,397 | Franks | Dec. 17, 1940 |